United States Patent [19]

Stuart et al.

[11] Patent Number: 6,076,844

[45] Date of Patent: Jun. 20, 2000

[54] VEHICLE ACCESS STEP ASSEMBLY

[75] Inventors: John W. Stuart; Gerald W. Askew, both of Fort Wayne, Ind.

[73] Assignee: Navistar International Transportation Corp., Chicago, Ill.

[21] Appl. No.: 09/479,041

[22] Filed: Jan. 7, 2000

Related U.S. Application Data

[62] Division of application No. 08/990,658, Dec. 15, 1997, Pat. No. 6,029,989.
[51] Int. Cl.[7] .................................. B60R 3/00; E04G 3/10
[52] U.S. Cl. ................................. 280/163; 182/150
[58] Field of Search .................................. 280/163, 164.1, 280/164.2, 165, 169; 182/150, 196; 248/154, 230.8

[56] References Cited

U.S. PATENT DOCUMENTS

| | | |
|---|---|---|
| 4,102,432 | 7/1978 | Bustin . |
| 5,054,799 | 10/1991 | Fingerle . |
| 5,593,167 | 1/1997 | Barnhardt et al. . |

*Primary Examiner*—Lanna Mai
*Assistant Examiner*—Jeff Restifo
*Attorney, Agent, or Firm*—Jeffrey P. Calfa; Dennis Kelly Sullivan

[57] ABSTRACT

The apparatus for providing access steps to a vehicle and a method of installing same on a heavy or medium duty truck. In its most basic form, the apparatus is comprised of an access step and two step brackets. The brackets are installed to outer surfaces of the tank straps which hold a fuel tank to a frame rail of the vehicle. The access step and step brackets have tabs and flaps or slots which can be combined to attach the access step to the step brackets with a reduced number of fasteners.

5 Claims, 10 Drawing Sheets

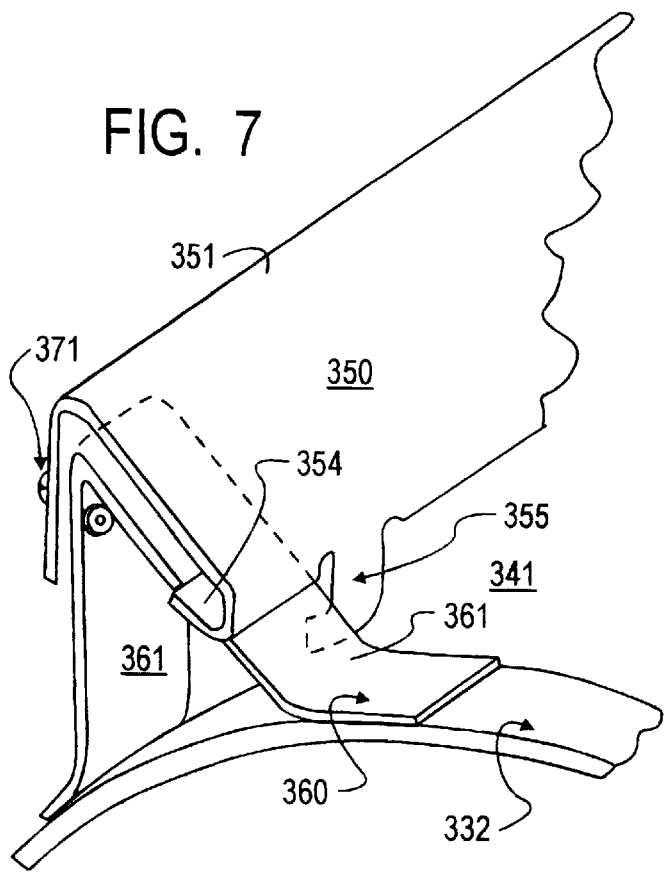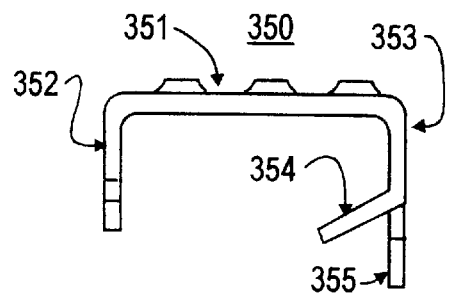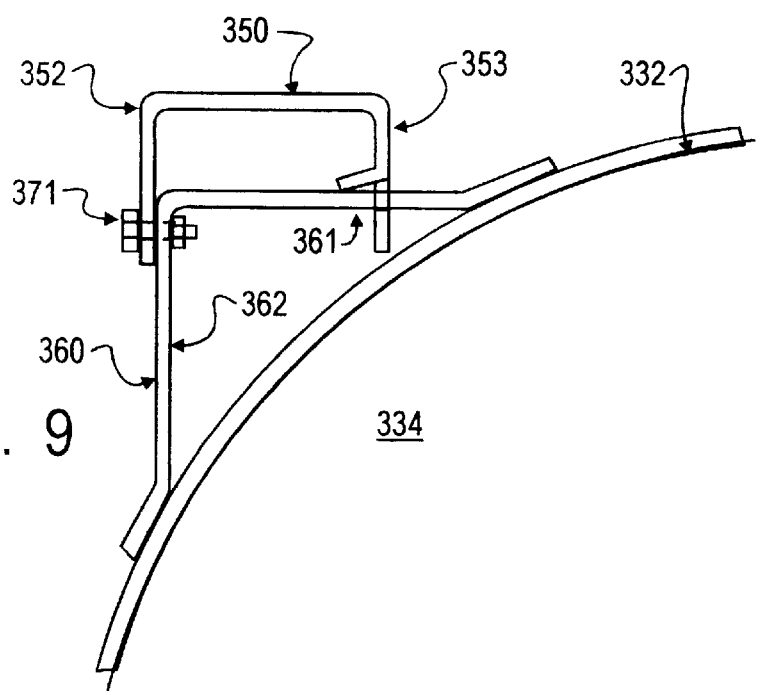

FIG. 22
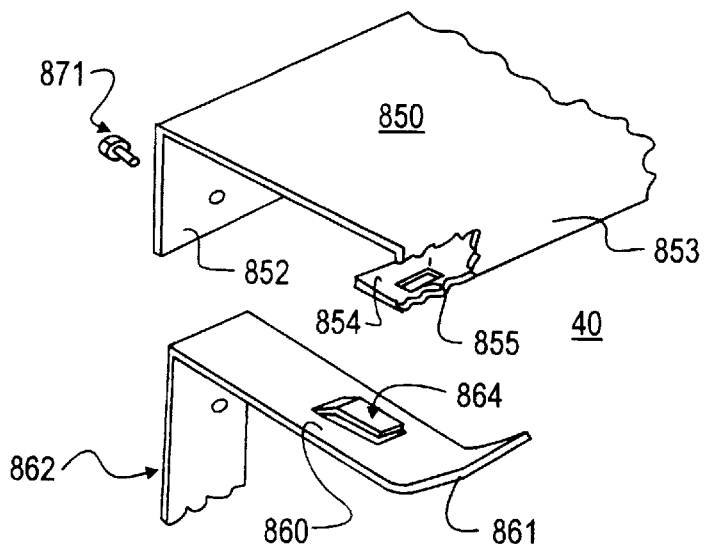
FIG. 23
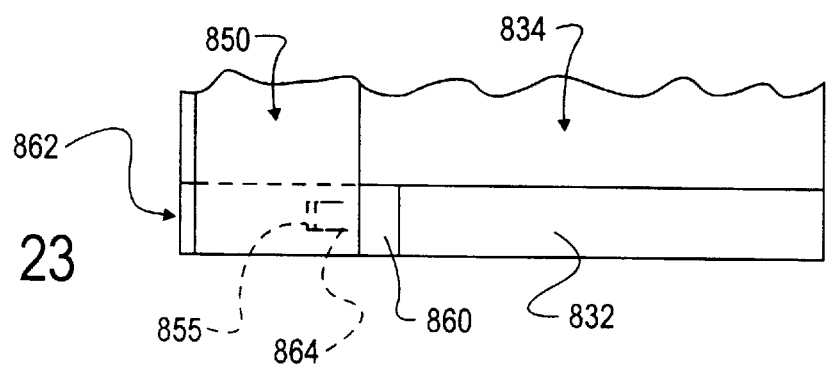
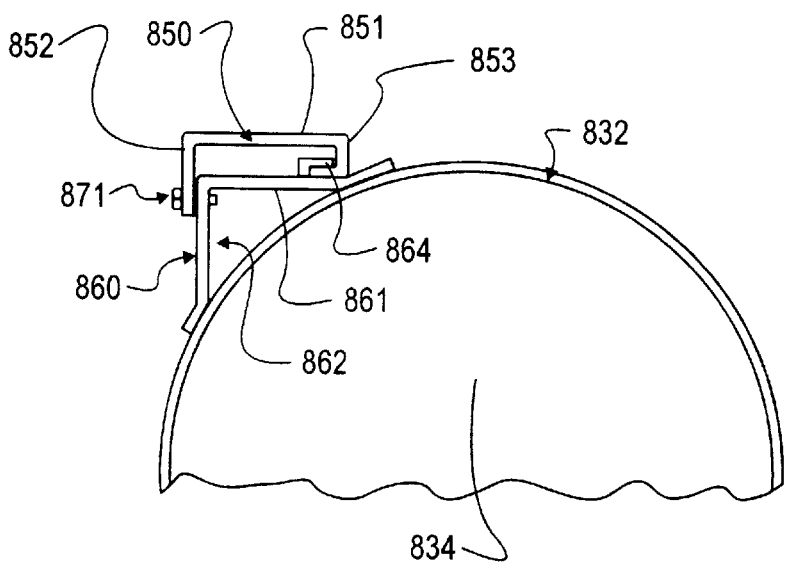
FIG. 24

VEHICLE ACCESS STEP ASSEMBLY

This is a division of application Ser. No. 08/990,658, filed Dec. 15, 1997 now U.S. Pat. No. 6,029,989.

BACKGROUND OF THE INVENTION

The present invention relates to access steps to a heavy duty truck cab and a method of installing same on a heavy duty truck. More specifically, the apparatus allows access steps to be mounted without the use of fasteners such as screws or rivets at one of the two prior art access step attachment points or without the use of any fasteners at both access step attachment points.

THE PRIOR ART

Heretofore, heavy duty truck access steps were installed to the trucks by use of multiple fasteners such as screws or rivets with attachment of the steps requiring two sets of fasteners required for each lateral attachment location. Considerable time was required to install these access steps while the vehicle was on a main assembly line thereby delaying the entire vehicle's production time. The steps are installed longitudinally to a component on the side of the vehicle. This vehicle component has been a fuel tank which was mounted to a frame rail of the vehicle. Step brackets are mounted to strap brackets which run around a portion of the outer diameter of the fuel tank. The access steps need to be wide enough to accomodate a drivers foot. Due to the width of the steps, each longitudinal attachment area required two sets of fasteners such as screws or rivets. There is a need for access steps which may be mounted with only one set or no sets of screws or rivets at each longitudinal attachment area. To date, however, a vehicle access step which can be installed as such has not been proposed.

SUMMARY OF THE INVENTION

Accordingly, a primary object of the apparatus and method of the present invention is to provide vehicle manufacturing personnel with an access step for vehicles which may be installed with only one set or no sets of fasteners such as screws or rivets at each longitudinal attachment area. The objective is satisfied by using different embodiments of tabs which engage slots or flaps. The tabs are either a part of the access step or a part of the brackets affixed to the vehicle mounted component to which the access step is engaged to. The slots will be on the brackets affixed to the vehicle mounted component where the tabs are part of the access steps and the slots or flaps will be a part of the access steps where the tabs are part of the brackets. Not only will the reduction of fasteners improve production efficency but it will also improve maintenance on vehicles once in the hands of consumers and eliminates exposed fasteners on the horizontal stepping surface. Less fasteners means less parts to keep track of during maintenance. There are nine embodiments of the apparatus described below with the preferred embodiment being the first described.

BRIEF DESCRIPTION OF THE DRAWINGS

Other objects and advantages of the invention will become more apparent upon perusal of the detailed description thereof and upon inspection of the drawings in which:

FIG. 7 is a perspective view of a third embodiment of this invention.

FIG. 8 is a partial side view of the embodiment of this invention shown in FIG. 7.

FIG. 9 is a side view of an access step of the embodiment of this invention shown in FIG. 7.

FIG. 22 is a perspective view of a disassembled eighth embodiment of this invention.

FIG. 23 is a partial top down view of the embodiment of this invention shown in FIG. 22.

FIG. 24 is a partial side view of the embodiment of this invention shown in FIG. 22.

DESCRIPTION OF THE PREFERRED EMBODIMENT

Figure 1:
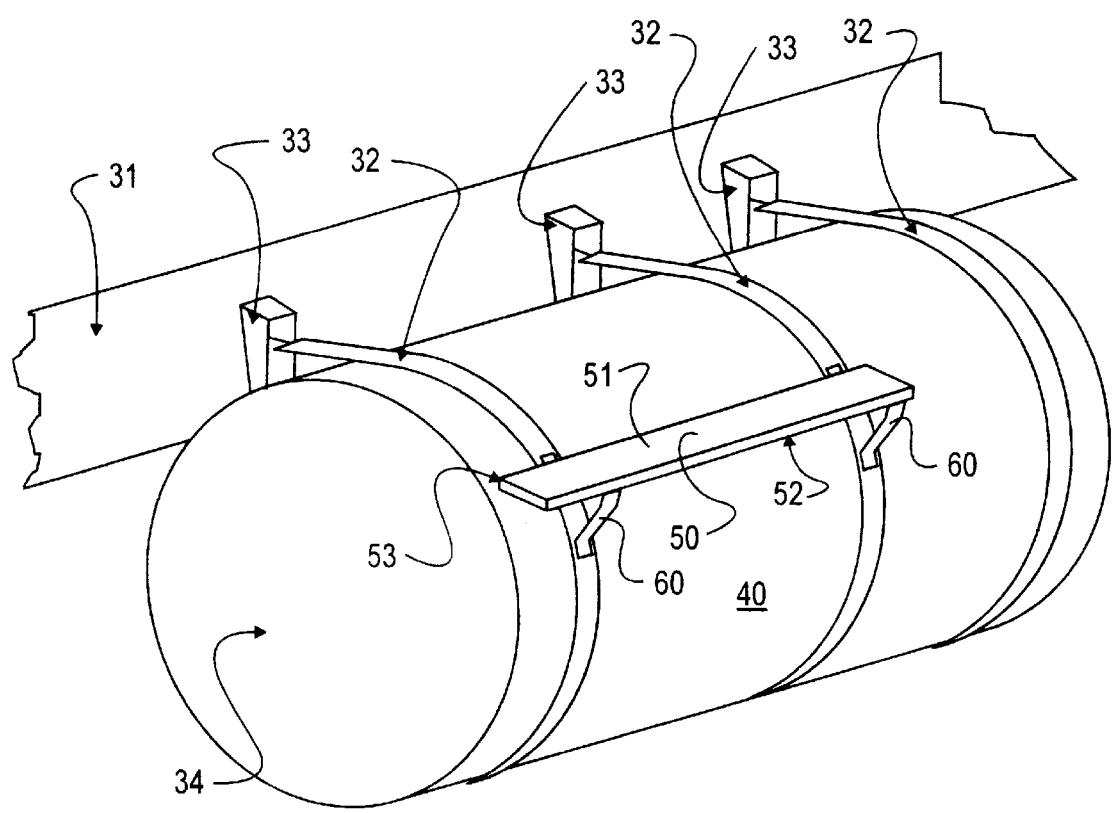
FIG. 1 is a perspective view of vehicle access steps of the present invention installed to a fuel tank assembly installed to a frame rail of a vehicle.

Referring now to the drawings in greater detail, there is illustrated in FIG. 1 a frame rail 31 of a vehicle 31 (not shown). A fuel tank 34 is attached to the frame rail 31 by a combination of three tank straps 32 and three frame brackets 33. A vehicle access step assembly 40 is installed to an outer surface of two of the three tank straps 32. FIG. 1 is provided to give perspective to the different embodiments of the invention which involve the construction of the vehicle access step assembly 40 and are shown in FIGS. 2 to 27. An additionaly vehicle access step assembly 40 may also be attached to an outer surface of two of the three tank straps 32.

The vehicle access step assembly 40 is generally comprised of three components: an access step 50 and two step brackets 60. The access step 50 is comprised of a top surface 51, a front side 52 and a rear side 53. Portions of the front side 52 and rear side 53 are perpendicular to the top surface 51 and in a vertical position. The embodiments of the invention involve the engagement of the access step 50 to the step brackets 60 through a step-to-bracket means 41 which uses tabs and slots or flaps which combined reduce the number of screws or rivets previously needed for the engagement. The number designations for the individual embodiments of the invention shown will have a prefix number indicating the embodiment with the second two digits conforming to the above convention.

Figure 2:
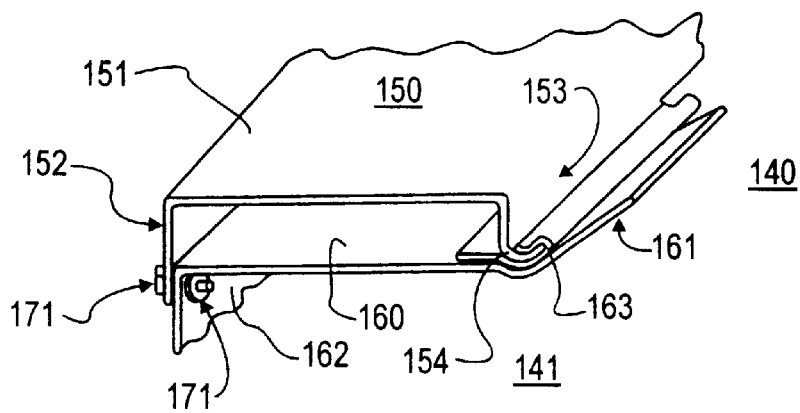
FIG. 2 is a perspective view of a first embodiment of this invention.
Figure 3:
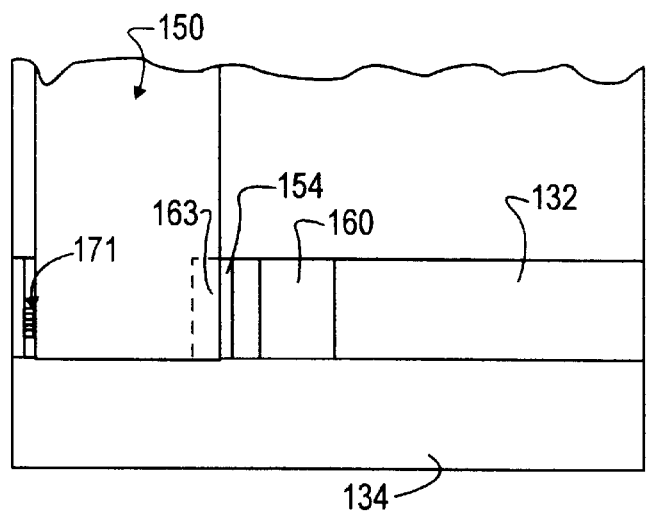
FIG. 3 is a partial top down view of the embodiment of this invention shown in FIG. 2.
Figure 4:
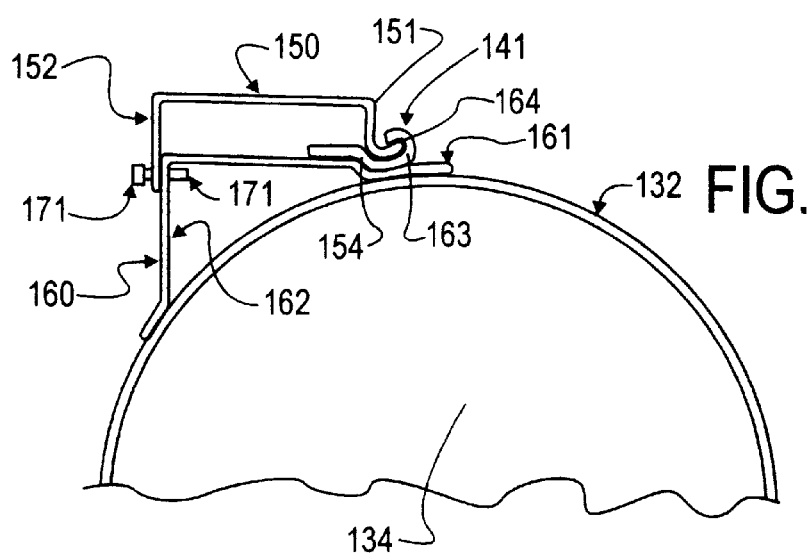
FIG. 4 is a partial side view of the embodiment of this invention shown in FIG. 2.

A first embodiment of the invention is shown in FIGS. 2 to 4. FIG. 2 shows a partial perspective of one end of an access step 150 and its rear attachment to one of two step brackets 160 with the second step bracket 160 not shown but engaged to the access step 150 the same as the first. The access step 150 is comprised of a top surface 151, a front side 152 and a rear side 153. See FIGS. 2 to 4. A step-to-bracket attachment means 141 for attaching a portion of the rear side 153 of the access step 150 to an inner portion 161 of the step bracket 160 is comprised of a tab 154 off of the rear side 153 and an engagement receiver piece 163 containing a slot 164, attached to the inner portion 161. The tab 154 is a continuation of the rear side 153 which curves concave upwards away from the step bracket 160 and is approximately the same width as the step brackets 160. The engagement receiver piece 163 is permanently attached to an upwards facing part of the inner portion 161 of the step bracket 160. The engagement receiver piece 163 is shaped to form a lengthwise slot 164 shaped to engage the tab 154. The engagement between the slot 164 and the tab 154 is accomplished without the use of screws and rivets. The front side 152 of the access step 150 is attached to an outer portion 162 of the step bracket 160 by use of conventional screws 171. The engagement receiver pieces 163 may be integral parts of the step brackets 160.

In use an assembly line worker first attaches the step brackets 160 to two tank straps 132 holding a fuel tank 134 to a frame rail 131 (not shown). Then the worker will hold the access step 150 with the top surface 151 facing upwards with the front side 152 tilted up to allow the tabs 154 fit into the slots 164. The front side 152 of the access step 150 is pivoted downward to engage the rear side 153 to the inner portion 161 of each of the step brackets 160. The worker then uses the screws 171 to attach the front side 152 of the access step 150 to the outer portion 162 of the step brackets.

Figure 5:
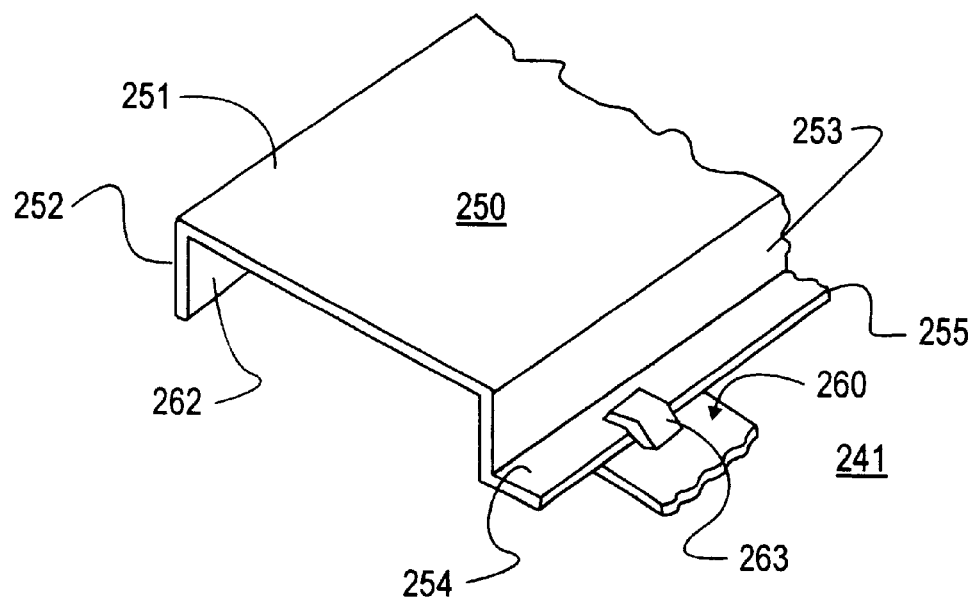
FIG. 5 is a perspective view of a second embodiment of this invention.
Figure 6:
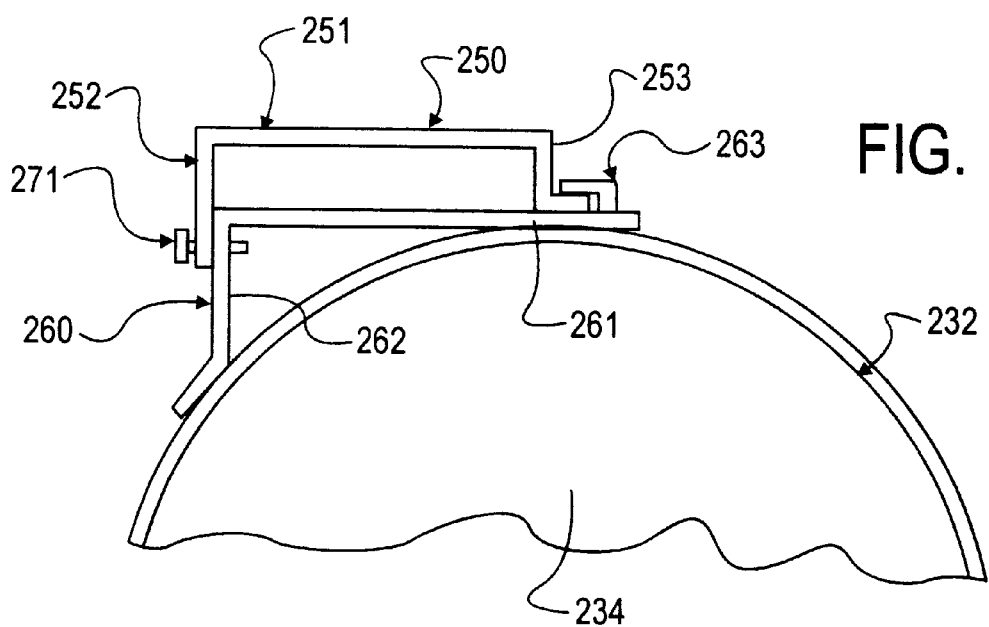
FIG. 6 is a partial side view of the embodiment of this invention shown in FIG. 5.

A second embodiment of the invention is shown in FIGS. 5 and 6. FIG. 5 shows the rear attachment of an access step 250 to a step bracket 260. A second step bracket 260 is not shown but engaged to the access step 250 the same as the first. The access step 250 is comprised of a top surface 251, a front side 252 and a rear side 253. See FIGS. 5 and 6. A step-to-bracket attachment means 241 for attaching a portion of the rear side 253 of the access step 250 to an inner portion 261 of the step bracket 260 is comprised of a flap 254 on the rear side 253 and a retaining tab 263 on an inner portion 261 of the step bracket 260. The flap 254 is a continuation of the rear side 253 which is perpendicular to the rear side 253 and is directed away from the top surface 251 of the access step 250. The retaining tab 263 is permanently attached to an upwards facing part of the inner portion 261 of the step bracket 260. The retaining tab 263 is rectangular when viewed from above and when viewed from the side it is 'C' shaped to engage the flap 254. The engagement between the flap 254 and the retaining tab 263 is accomplished without the use of screws and rivets. An outer edge 255 of the flap 254 slips horizontally into the retaining tab 264. The front side 252 of the access step 250 is attached to an outer portion 262 of the step bracket 260 by use of conventional screws 271.

In use an assembly line worker first attaches the step brackets 260 to two tank straps 232 holding a fuel tank 234 to a frame rail 231 (not shown). Then the worker will hold the access step 250 horizontally with the top surface 251 facing upwards. The outer edge 255 of the flap 254 of the access step 250 is slipped into the retaining tab 263 to engage the rear side 253 to the inner portion 261 of each of the step brackets 260. The worker then uses the screws 271 to attach the front side 252 of the access step 250 to the outer portion 262 of the step brackets 260.

A third embodiment of the invention is shown in FIGS. 7, 8 and 9. FIG. 7 shows an access step 350 attached to a step bracket 360. A second step bracket 360 is not shown but engaged to the access step 350 the same as the first. The access step 350 is comprised of a top surface 351, a front side 352 and a rear side 353. See FIGS. 7, 8, and 9. A step-to-bracket attachment means 341 for attaching a portion of the rear side 353 of the access step 350 to an inner portion 361 of the step bracket 360 is comprised of an engagement flap 354 and a tab 355 off of the rear side 353 which engage the access step 350 to an inner portion 361 of the step bracket 360. The engagement flap 354 is a continuation of the rear side 353 of the access step 350 corresponding to and of the same width as the step brackets 360 which turns inwardly and under the top surface 351 of the access step 350. The tabs 355 are also continuations of the rear side 353 adjacent to the engagement flaps 354 which extend below the engagement flaps 354 and bend under a vertical portion of the rear side 353 from which the engagement flaps 354 continue out of. The spacing between the engagement flap 354 and the tab 355 is such that the inner portion 361 of the step bracket fits snugly therebetween when the access step 350 is installed. The engagement between the engagement flap 354 and the tab 355 of the access step 350 and step bracket 360 is accomplished without the use of screws and rivets. The front side 352 of the access step 350 is attached to an outer portion 362 of the step bracket 360 by use of conventional screws 371.

In use an assembly line worker first attaches the step brackets 360 to two tank straps 332 holding a fuel tank 334 to a frame rail 331 (not shown). Then the worker will hold the access step 350 with the top surface 351 tilted slightly upwards at the front side 352. The access step 350 is slid horizontally into its lengthwisw location. The worker then tilts the front side 352 downwards to engage the engagement flaps 354 and tabs 355 to the step brackets 360. The worker then uses the screws 371 to attach the front side 352 of the access step 350 to the outer portion 362 of the step brackets 360.

Figure 10:
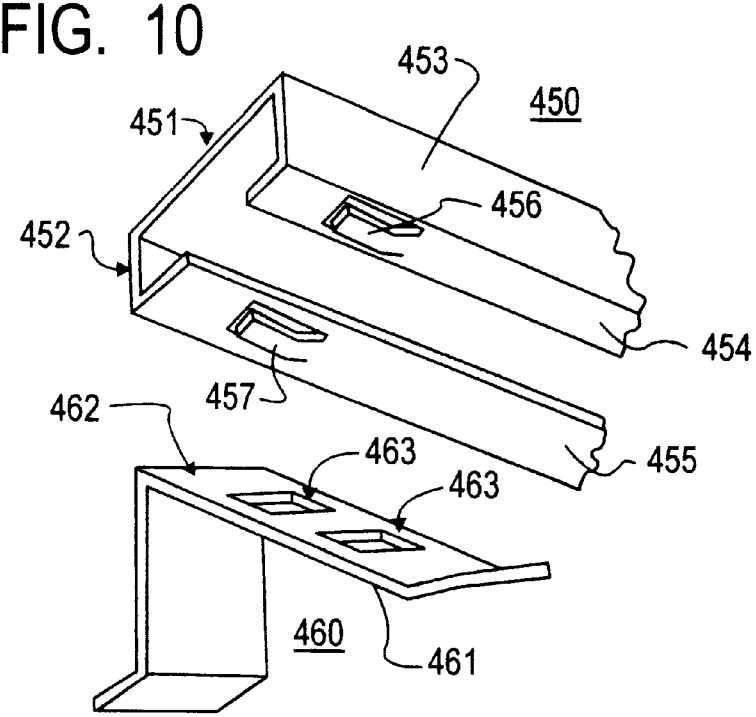
FIG. 10 is a perspective view of a disassembled fourth embodiment of this invention.
Figure 11:
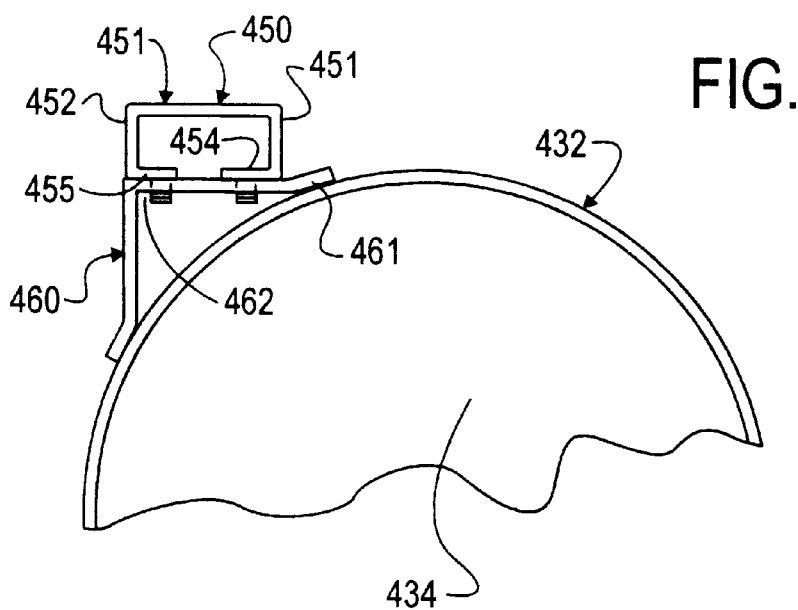
FIG. 11 is a partial side view of the embodiment of this invention shown in FIG. 10.

A fourth embodiment of the invention is shown in FIGS. 10 and 11. FIG. 10 shows an access step 450 separate from a step bracket 460 designed for engagement of same. FIG. 11 shows a side view of the access step 450 engaged to the step bracket 460 which is attached to a tank strap 432 holding a fuel tank 434 (partially shown) to a frame rail 431 (not shown). A second step bracket 460 is not shown but attached to the access step 450 in the same manner as the first step bracket 460. The access step 450 is comprised of a top surface 451, a front side 452 and a rear side 453. A rear engagement flap 454 is a continuation of the rear side 453 which turns perpendicularly inward and under the top surface 451. A front engagement flap 455 is a continuation of the front side 452 which turns perpendicularly inward and under the top surface 451. The rear engagement flap 454 has rear retaining tabs 456 which correspond to an inner portion 461 of each of the step brackets 460. The front engagement flap 455 has front retaining tabs 457 which also correspond to an outer portion 462 of each of the step brackets 460. Each of the step brackets 460 has two slots 463, one on the outer portion 462 and one on the inner portion 461 which are shaped to receive the front retaining tabs 457 and the rear retaining tabs 456. In the embodiment shown in FIGS. 10 and 11, the slots are square holes through the step bracket 460 and the front retaining tabs 457 and rear retaining tabs 456 are upraised rectangular pieces parallel to the front engagement flap 455 and rear engagement flap 454. In the preferred embodiment, the front retaining tabs 457 and rear retaining tabs 456 are all directed towards one end of the access step 450. This would allow an assembly line worker to engage the retaining tabs 456 and 457 into the slots 463 and then to slide the access step 450 horizontally relative to the length of the frame rail 431 to engage the access step 450 to both the inner portions 461 and the outer portions 462 of the step brackets 460 with no screws or rivets.

Figure 12:
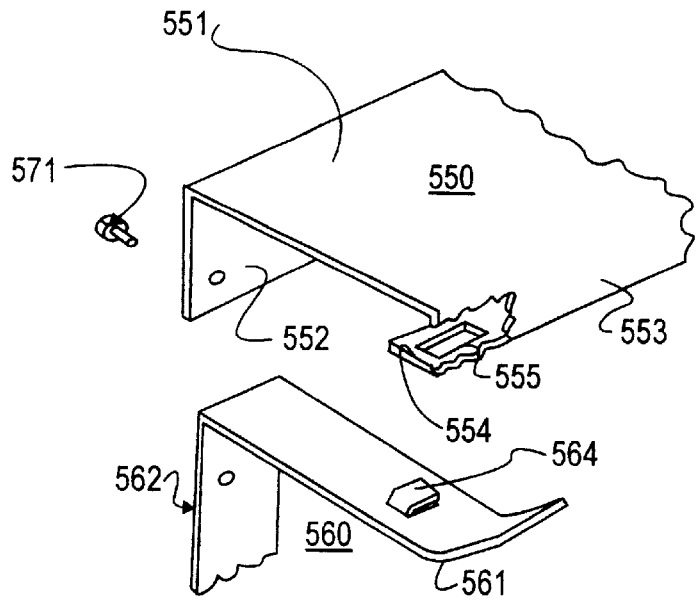
FIG. 12 is a perspective view of a disassembled fifth embodiment of this invention.
Figure 13:
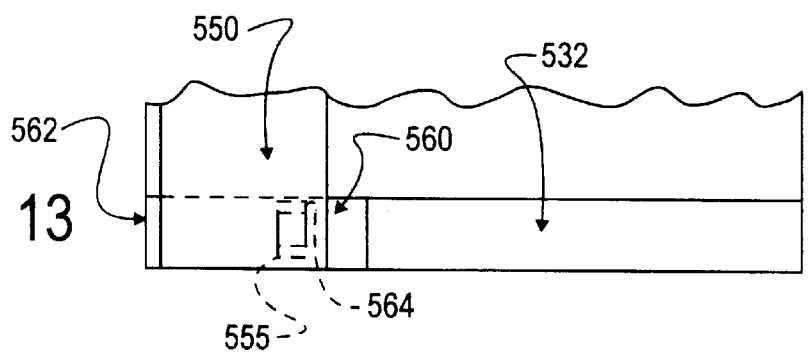
FIG. 13 is a partial top down view of the embodiment of this invention shown in FIG. 12.
Figure 14:
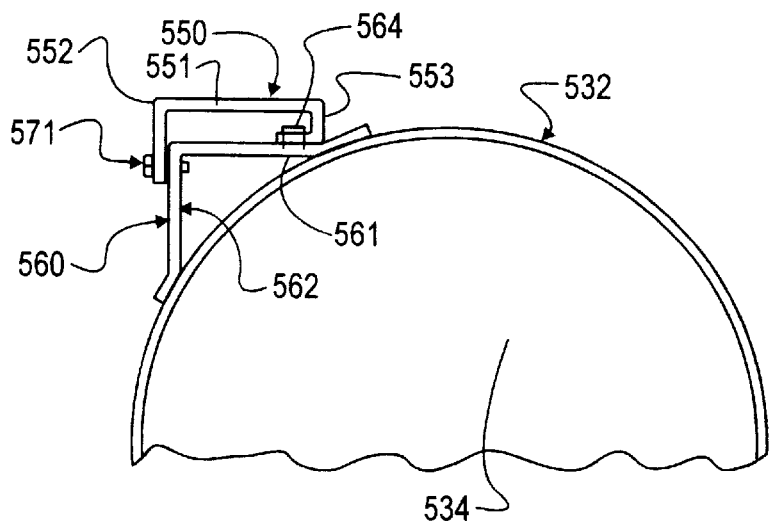
FIG. 14 is a partial side view of the embodiment of this invention shown in FIG. 12.

A fifth embodiment of the invention is shown in FIGS. 12 to 14. FIG. 12 shows an access step 550 separate from a step bracket 560 designed for engagement of same. FIGS. 13 and 14 show partial top and side views of the access step 550 engaged to the step bracket 560 which is attached to a tank strap 532 holding a fuel tank 534 (partially shown) to a frame rail 531 (not shown). A second step bracket 560 is not shown but attached to the access step 550 in the same manner as the first step bracket 560. The access step 550 is comprised of a top surface 551, a front side 552 and a rear side 553. A rear engagement flap 554 is a continuation of the rear side 553 which turns perpendicularly inward and under the top surface 551. FIG. 12 shows the rear side partially cut away to show the construction of the rear engagement flap 554. The rear engagement flap 554 has rectangular slots 555 to correspond to each of the step brackets 560. Each step bracket has a retaining tab 564 on an inner portion 561 which is an upraised rectangular piece parallel to the rear engagement flap 554 and directed perpendicular to the length of the step brackets 560. The front side 552 of the access step 550 is attached to an outer portion 562 of the step bracket 560 by use of conventional screws 571.

In use an assembly line worker first attaches the step brackets 560 to two tank straps 532 holding a fuel tank 534 (partially shown) to a frame rail 531 (not shown). The access step 550 is attached to the inner portions 561 of the step brackets 560 by engaging the retaining tabs 564 into the slots 555 and then sliding the access step 550 horizontally lengthwise relative to the length of the frame rail 531 to engage the access step 550 to both the inner portions 561 of the step brackets. The worker then uses the screws 571 to attach the front side 552 of the access step 550 to the outer portion 562 of the step brackets 560.

Figure 15:
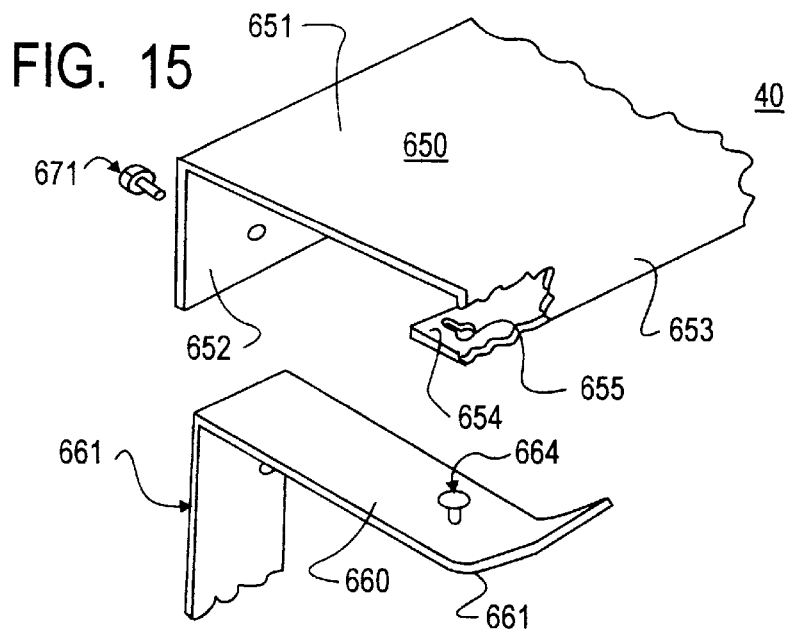
FIG. 15 is a perspective view of a disassembled sixth embodiment of this invention.
Figure 16:
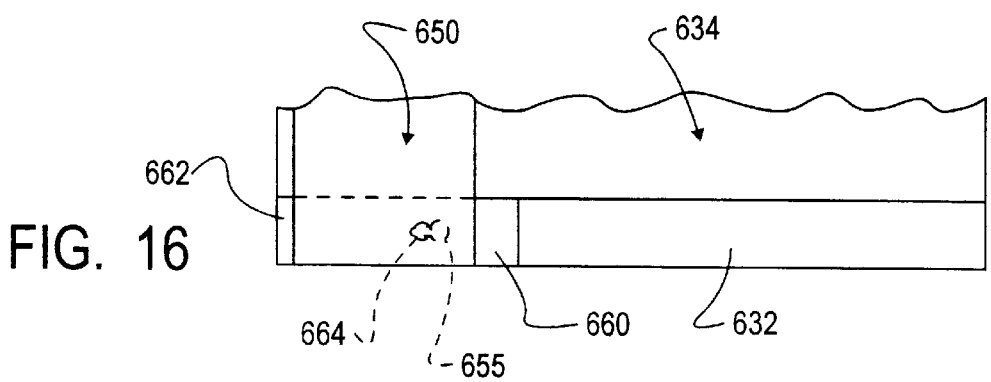
FIG. 16 is a partial top down view of the embodiment of this invention shown in FIG. 15.
Figure 17:
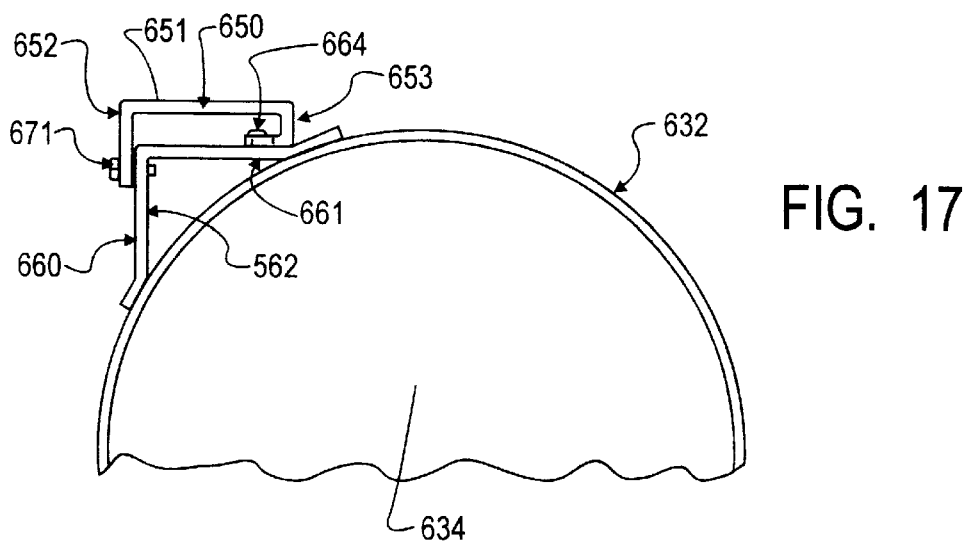
FIG. 17 is a partial side view of the embodiment of this invention shown in FIG. 15.
Figure 18:
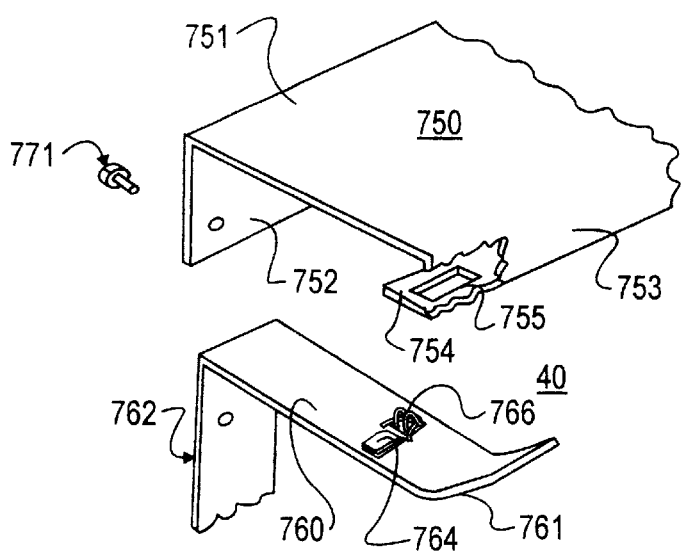
FIG. 18 is a perspective view of a disassembled seventh embodiment of this invention.
Figure 20:
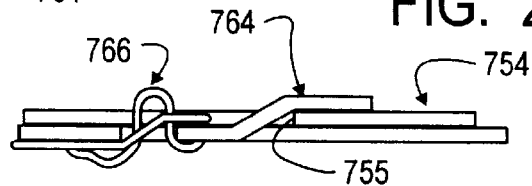
FIG. 20 is a partial cutaway side view of the embodiment of this invention shown in FIG. 19 defined by line A—A.
Figure 19:
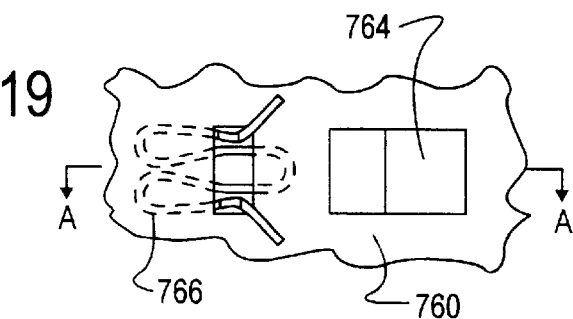
FIG. 19 is a partial bottom up view of the embodiment of this invention shown in FIG. 18.
Figure 21:
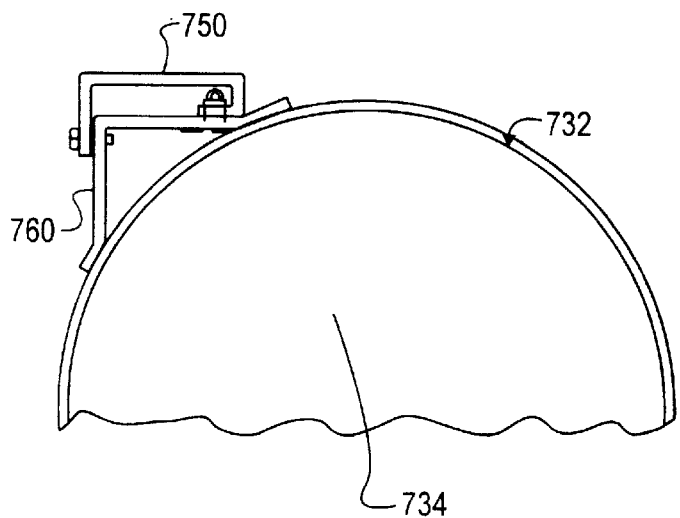
FIG. 21 is a partial side view of the embodiment of this invention shown in FIG. 18.

A sixth embodiment of the invention is shown in FIGS. 15 to 17. The only difference between the sixth embodiment and the fifth embodiment is that in the sixth embodiment there are upraised mushroom shaped retaining tabs 664 and there are key shaped slots 655 in rear engagement flaps 654. FIG. 15 shows the key shaped slots 655 aligned so that an assembly line worker would engage the retaining tabs 664 into the slots and push the access step inwards towards the fuel tank 634 to engage the access step 450 to an inner portion 661 of the step brackets 660, however, the key shaped slots 655 could also be aligned to require the worker to slide the access step 650 horizontally lengthwise relative to the frame rail 631. This change in alignment would be done dependent on the forces expected to be placed on the access step 650 upon installation.

A seventh embodiment of the invention is shown in FIGS. 18 to 21. The seventh embodiment is another variation of the fifth embodiment. The prime difference between the seventh embodiment and the fifth embodiment is that in the seventh there is a cam shaped locking spring 766 mounted on an inner portion 761 of each of two step brackets 760. Each locking spring 766 is mounted adjacent to rectangular retaining tab 764 which is the analogous to the retaining tab 564 in the fifth embodiment. A slot 755 in a rear engagement flap 754 is analogous to the slot 555 in the fifth embodiment except that in the seventh embodiment, the slot 755 is sized to engage both the retaining tab 764 and the locking spring 766. Upon sliding the access step 750 horizontally lengthwise to engage the retaining tab 764 as described above for the fifth embodiment, the locking spring 766 will slip into the slot 755 and lock the retaining tab 764 into the slot 755. Only compression of the locking springs 766 will release the inner portions 761 of the step brackets. Attachment of the access step 750 to the outer portion 762 of the step brackets 760 is the same as in the fifth embodiment.

An eighth embodiment is shown in FIGS. 22 to 24. The only difference between the eighth embodiment and the fifth embodiment is that in the eighth embodiment there is a retaining tab 864 that although shaped the same as the retaining tab 564, is directed inwardly towards the fuel tank 834. This requires a worker to push the access step 850 inwards towards the fuel tank 834 upon engaging the retaining tab 864 into the slot 855 of the rear engagement flap 854 versus the horizontal lengthwise movement required of the fifth embodiment. As in the sixth and seventh embodiments, attachment of the access step 850 to the outer portion 862 of the step brackets 860 is the same as in the fifth embodiment.

Figure 25:
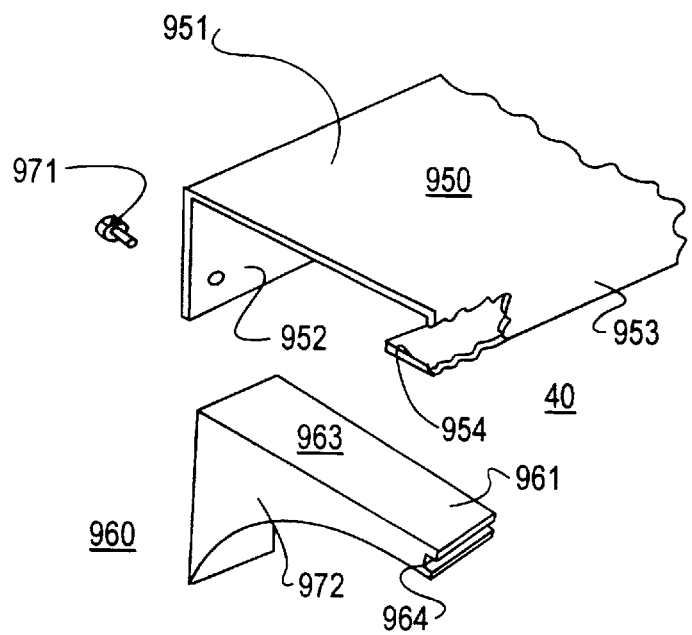
FIG. 25 is a perspective view of a disassembled ninth embodiment of this invention.
Figure 26:
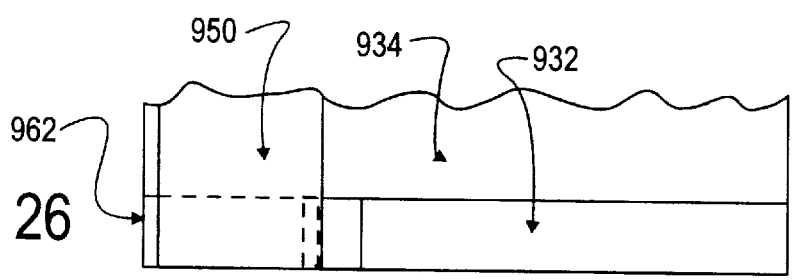
FIG. 26 is a partial top down view of the embodiment of this invention shown in FIG. 25.
Figure 27:
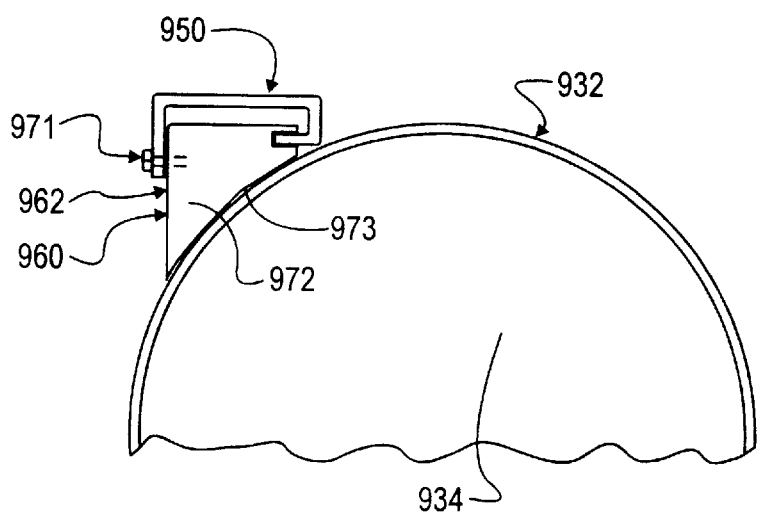
FIG. 27 is a partial side view of the embodiment of this invention shown in FIG. 25.

A ninth embodiment is shown in FIGS. 25 to 27. FIG. 25 shows an access step 950 separate from a step bracket 960 designed for engagement of same. FIGS. 26 and 27 show top and side views of the access step 950 engaged to the step bracket 960 which is attached to a tank strap 932 holding a fuel tank 934 (partially shown) to a frame rail 931 (not shown). A second step bracket 960 is not shown but attached to the access step 950 in the same manner as the first step bracket 960. The access step 950 is comprised of a top surface 951, a front side 952 and a rear side 953. A rear engagement flap 954 is a continuation of the rear side 953 which turns perpendicularly inward and under the top surface 951. FIG. 25 shows the rear side partially cut away to show the construction of the rear engagement flap 954. The step bracket is comprised of a top surface 963 and a back side 962. The back side 962 is perpendicular to the top surface 963. There are two side pieces 972 attached to the top surface 963 and the back side 962. Each side piece has a curved edge corresponding to an outer radial portion of the tank straps 932. A mating surface piece 973 is located between the side pieces 972 and is also shaped to correspond to an outer portion of the tank straps 932. A tab piece 964 is located between the top surface 963 and the mating surface piece 973. The tab piece is shaped to engage the rear engagement flap 954.

In use an assembly line worker first attaches the step brackets 960 to two tank straps 932 holding a fuel tank 934

(partially shown) to a frame rail 931 (not shown). The access step 950 is attached to the step brackets 960 by engaging the tab pieces 964 with the rear engagement flaps 954. The worker then uses the screws 971 to attach the front side 952 of the access step 950 to the back side 962 of the step brackets 960.

As described above the vehicle access step assembly 40 and the method of engaging same of the present invention provide a number of advantages, some of which have been described above, and others of which are inherent in the invention. Also, modifications may be proposed to the vehicle access step assembly 40, and method without departing from the teachings herein. Accordingly, the scope of the invention is only to be limited as necessitated by the accompanying claims.

What is claimed is:

1. In combination with a vehicle having a frame rail and a fuel tank attached to the frame rail by two tank straps and frame brackets, a vehicle access step assembly, comprising:

(a) two step brackets with each of said step bracket being attached to an outer surface of each of said tank straps;

(b) an access step with a top surface, a front side and a rear side, portions of said front and rear sides being approximately perpendicular to said top surface and in a vertical position;

(c) said front side of said access step is attached to an outer portion of each of said step brackets;

(d) a step-to-bracket attachment means for attaching said rear side of said access step to inner portions of each of said step brackets without the use of screws and rivets; and (e) said step-to-bracket attachment means comprising
        said rear side of said access step having tabs corresponding to each of said step brackets;
        said tabs each being a continuation of said rear side which curves concave upwards away from said step brackets of said access step and corresponds to the width of said step brackets; and
        engagement receiver pieces attached to an inner and upper portion of each of said step brackets, each of said engagement receiver pieces having an outwardly facing slot shaped to engage and engaging said tabs.

2. The vehicle access step assembly of claim 1, wherein:

(a) said engagement receiver pieces are integral parts of said step brackets.

3. In combination with a vehicle having a frame rail and a fuel tank attached to the frame rail by two tank straps and frame brackets, a vehicle access step assembly, comprising:

(a) two step brackets with each of said step bracket being attached to an outer surface of each of said tank straps;

(b) an access step with a top surface, a front side and a rear side, portions of said front and rear sides being approximately perpendicular to said top surface and in a vertical position;

(c) said front side of said access step is attached to an outer portion of each of said step brackets;

(d) a step-to-bracket attachment means for attaching said rear side of said access step to inner portions of each of said step brackets without the use of screws and rivets; and (e) said step-to-bracket attachment means comprising
        said rear side of said access step having a flap which is flat, perpendicular to said rear side, and has an outer edge directed away from said top surface of said access step; and
        each of said step brackets having a square retaining tab which is shaped to engage and engages said outer edge of said flap.

4. A method for engaging an access step to a vehicle having a frame rail and a fuel tank attached to the frame rail by two tank straps and frame brackets, comprising the steps of:

(a) attaching a step bracket on an outer radial surface of each of the tank straps;

(b) attaching an access step with a top surface, a front side side and a rear side, with portions of said front and rear sides being approximately perpendicular to said top surface and in a vertical position to an inner portion of each of said step brackets by use of a step-to-bracket attachment means without the use of screws and rivets;

(c) attaching said front side of said access step to an outer portion of said step brackets; and (d) wherein said step-to-bracket attachment means is comprised of:
        (i) said rear side of said access step having tabs corresponding to each of said step brackets;
        (ii) said tabs each being a continuation of said rear side which curves concave upwards away from said top surface of said access step and corresponds to the width of said step brackets; and
        (iii) engagement receiver pieces attached to an inner and upper porton of each of said step brackets, each of said engagement receiver pieces having an outwardly facing slot shaped to engage and engaging said tabs.

5. The vehicle access step assembly of claim 4, wherein:

(a) said engagement receiver pieces are integral parts of said step brackets.

* * * * *